United States Patent [19]
Campo

[11] Patent Number: 5,910,653
[45] Date of Patent: Jun. 8, 1999

[54] SHELF TAG WITH AMBIENT LIGHT DETECTOR

[75] Inventor: James A. Campo, Brunswick, Ohio

[73] Assignee: Telxon Corporation, Akron, Ohio

[21] Appl. No.: 08/826,909

[22] Filed: Apr. 9, 1997

[51] Int. Cl.[6] .............................. H01J 40/14; G09G 3/36
[52] U.S. Cl. .............................. 250/214 AL; 250/214 B; 250/205; 345/102
[58] Field of Search .................... 250/214 AL, 214 B, 250/205; 235/383; 345/48, 52, 102, 207; 705/28, 400

[56] References Cited

U.S. PATENT DOCUMENTS

| | | |
|---|---|---|
| 3,665,224 | 5/1972 | Kelsey . |
| 3,704,374 | 11/1972 | Kaufman . |
| 4,303,855 | 12/1981 | Bapst et al. .............................. 250/226 |
| 4,766,295 | 8/1988 | Davis et al. . |
| 5,193,201 | 3/1993 | Tymes .............................. 364/DIG. 2 |
| 5,239,295 | 8/1993 | Deluca et al. . |
| 5,299,117 | 3/1994 | Farnbach . |
| 5,436,551 | 7/1995 | Myer . |
| 5,491,330 | 2/1996 | Sato et al. . |
| 5,539,393 | 7/1996 | Barford . |
| 5,572,653 | 11/1996 | DeTemple et al. . |

Primary Examiner—Stephone B. Allen
Attorney, Agent, or Firm—Renner, Otto, Boisselle & Sklar, P.L.L.

[57] ABSTRACT

The present invention relates to an electronic shelf display device which includes an optical device and an ambient light detector circuitry. The electronic shelf display device includes an independent power source, and a housing. The electronic shelf display device also includes a processor disposed in the housing, and a display device supported by the housing and coupled to the processor. The display device is capable of displaying information to a user. The optical device is coupled to the processor for at least receiving optical communications. The ambient light detector circuitry is also coupled to the processor. The processor is operative to regulate the power state of the electronic shelf display device based on ambient lighting conditions determined by the ambient light detector circuitry. By having the optical device include the ambient light detector, only one port is required for receiving light by the electronic shelf display device thus resulting in substantial space savings. The electronic shelf display device senses the current ambient lighting conditions and controls its power state based on the current ambient lighting conditions around it.

29 Claims, 8 Drawing Sheets

| AMBIENT LIGHT | POWER STATE | COMPONENT A | COMPONENT B |
|---|---|---|---|
| VERY BRIGHT | 1 | ADJUST DISPLAY | ● |
| BRIGHT | 2 | ADJUST DISPLAY | ● |
| LESS BRIGHT | 3 | ADJUST DISPLAY | ● |
| NORMAL | 4 | NORMAL | ● |
| SLIGHTLY DIM | 5 | ILLUMINATE DISPLAY | ● |
| DIM | 6 | ILLUMINATE DISPLAY | ● |
| DARK | 7 | TURN OFF DISPLAY | ● |

SHELF TAG WITH AMBIENT LIGHT DETECTOR

TECHNICAL FIELD

The present invention relates generally to electronic devices for displaying information, and more particularly to a shelf tag for displaying information which employs an optical device for sensing and transmitting optical data, and for sensing ambient lighting conditions.

BACKGROUND OF THE INVENTION

An important aspect of any retail industry is to properly display and update prices associated with every product in the store. Price displays are often placed in clear plastic protective covers which connect to the edge of shelving underneath the product for which the price tag is associated. Thus, in order to change the price display of a particular item, an employee would have to print out a new paper price display and physically go to the location of the product in the store to switch the old price display held in the plastic cover with the new one. Additionally, someone would have to be responsible for ensuring that the price was simultaneously updated in the store computer so customers are charged the correct price for every item at the checkout counters.

Given the cumbersome tasks involved with updating and verifying the accuracy of the price tags associated with every product in a store, there has recently been developed an optical price tag. The optical price tag is a battery operated device which uses a liquid crystal display (LCD) to display pricing information and/or other information related to the product with which it is associated. Because the price tags can receive optical transmissions, automatic price updates can occur through ceiling mounted optical transceivers which communicate with the optical price tags. The ceiling mounted optical transceivers are connected to the store's host computer. With this technology, it is no longer necessary for store employees to spend many hours physically updating pricing information. Furthermore, since the store's host computer is used to initiate the price change, the price stored in the host computer will automatically match the price displayed on the shopping floor.

These optical shelf tags typically employ batteries as power sources since the batteries provide for easy installation of the shelf tags and make them easier to relocate as opposed to shelf tags which are hardwired for power and/or communications. However, one practical drawback with using a remote power supply such as a battery is that the batteries need to be replaced. Once the batteries are drained, the shelf tag becomes inoperative until it is replaced with another battery. Although current battery technology may provide for several useful years of life for powering the optical shelf tag before needing replacement, there is a continuing need for improvement of prolonged battery life so that the batteries will need replacing less often, and thus reducing the amount of extra time needed for maintenance of the optical shelf tags.

Furthermore, many conventional optical shelf tags employ LCD displays which can sometimes be difficult to read under certain ambient light conditions. For example, if it is very bright around the shelf tag, the display may be difficult to read. Likewise, if lighting conditions are dim, the shelf tag display may be difficult to read.

Accordingly, in view of the above, there is a strong need in the art for an electronic shelf tag which can vary its power state in accordance with surrounding ambient light in order to conserve power. Furthermore, there is a need for an electronic shelf tag which can vary its display characteristics according to ambient lighting conditions so as to optimize viewability of its display.

SUMMARY OF THE INVENTION

The present invention relates to an electronic shelf tag which includes an optical device for receiving and transmitting optical information. The optical device includes an ambient light detector which detects the ambient light around the shelf tag. By having the optical device include the ambient light detector, only one port is required for receiving light by the shelf tag thus resulting in substantial space savings. The shelf tag senses the current ambient lighting conditions and controls its power state based on the current ambient lighting conditions around it.

If the ambient lighting conditions around the shelf tag are of a bright state (e.g., daytime, building lights are on, a light (e.g., from a flash light) is being shined on the shelf tag, etc.), the shelf tag adjusts its power state in accordance with this lighting condition. Since the shelf tag is typically in use during the day time, or when the building lights are on, or when a person is shining a light on it, the shelf tag is placed in a normal power mode. In the normal power mode, the display of the shelf tag is activated for viewing by a user, and other components of the shelf tag are activated and powered up.

If the ambient lighting conditions around the shelf tag are of a dark state (e.g., nighttime, building lights are off, etc.), the shelf tag adjusts its power state so that it is in a low power mode (e.g., sleep mode). In the dark ambient lighting state, the shelf tag is not generally in use. Thus, the shelf tag powers down in order to conserve energy. The shelf tag deactivates various components such as the display device, and other non-essential devices that consume relatively large amounts of power. In this manner, power consumption is minimized and thus battery life of the shelf tag can be prolonged.

Various components of the shelf tag can be adjusted in accordance with the ambient lighting conditions around the shelf tag. For instance, if the ambient lighting conditions are bright, the display may be controlled (in terms of contrast, brightness, sharpness, etc.) so as optimize viewability. Similarly, if the ambient lighting conditions are dim but not dark, the display may be illuminated to optimize viewability.

In accordance with one aspect of the invention, an electronic shelf display device including an independent power source is provided, the electronic shelf display including: a housing; a processor disposed in the housing; a display device supported by the housing and coupled to the processor, the display device being capable of displaying information; an optical device coupled to the processor for at least receiving optical communications; and ambient light detector circuitry coupled to the processor, the ambient light detector circuitry being operative for regulating the power state of the electronic shelf display device based on ambient lighting conditions determined by the ambient light detector circuitry.

In accordance with another aspect of the invention, a system for displaying information is provided, the system including: a host computer, the host computer including: a processor for controlling the host computer; and; a memory device coupled to the processor for storing data; an optical apparatus coupled to the host computer wherein the host computer communicates with the electronic shelf display device; a plurality of electronic display devices, the electronic display devices including: an electronic shelf display device each including an independent power source including an independent power source, the electronic shelf display comprising: a housing; a processor disposed in the housing; a display device supported by the housing and coupled to the processor, the display device being capable of displaying information; an optical device coupled to the processor for at least receiving optical communications; and ambient light detector circuitry coupled to the processor, the ambient light detector circuitry being operative for regulating the power state of the electronic shelf display device based on ambient lighting conditions.

In accordance with yet another aspect of the present invention, a method for controlling the power state of an electronic display device is provided, including the steps of: using an ambient light detector to determine ambient lighting conditions; and using a processor to regulate the power state of the electronic display device based upon the ambient lighting conditions determined by the ambient light detector.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

The present invention will now be described with reference to the drawings, wherein like reference numerals are used to refer to like elements throughout.

As is mentioned above, the present invention relates to a shelf tag which includes an ambient light detector. In the exemplary embodiments described hereinafter, each shelf tag is used to communicate data such as price information, nutrition information, inventory information, advertisements or the like to a user. The shelf tag employs the ambient light detector in order to determine ambient lighting conditions. The shelf tag controls its power state in accordance with ambient lighting conditions. As a result, the present invention is able to conserve battery power used to power the shelf tag. It is recognized that the present invention contemplates other types of devices and is not intended to be limited necessarily to shelf tags.

Figure 1A:
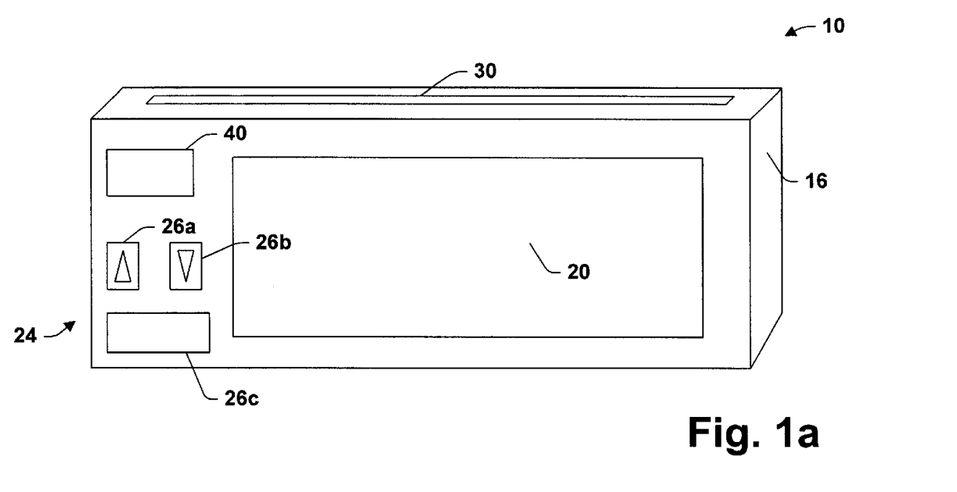
FIG. 1a is a perspective view of an exemplary shelf tag in accordance with the present invention.

Referring initially to FIG. 1a, a shelf tag 10 is shown in accordance with the present invention. The shelf tag 10 includes a housing 16 which is preferably made of metal, high strength plastic, or the like. Protruding from the back side of the housing 16 are mounting clips (not shown). The mounting clips afford for firmly mounting the shelf tag 10 to a shelf for example. Of course, it will be appreciated that the shelf tag 10 may be mounted in any of a variety of manners such as by screws, studs, etc., suitable for preventing unintended removal from a desired location. The housing 16 is adapted for easy disassembly to accommodate repair and replacement of parts such as batteries or lights for example.

The shelf tag 10 includes a display 20 such as a liquid crystal display (LCD) or the like. As is conventional, the display 20 functions to display data or other information relating to ordinary operation of the shelf tag 10. For example, the display 20 may display pricing information, inventory detail, etc. to a user. Additionally, the display 20 may display a variety of functions that are executable by the shelf tag 10. In the preferred embodiment, the display 20 displays alpha-numerical information such as for example the price of a product. As will be discussed in greater detail below, the display 20 is controlled by electronic circuitry within the shelf tag 10.

The shelf tag 10 further includes an operator input device 24 in the form of a key buttons which enables a user to enter data, information, function commands, etc. as is conventional. For example, the user may input information relating to price via the key buttons for subsequent transmission to a base station (not shown). In addition, the key buttons 24 include up and down cursor keys 26a and 26b, respectively, for controlling a cursor which may be shown on the display 20. By selectively pressing the up and down cursor keys 26a and 26b, the user is able to move the cursor about the display 20. Furthermore, the key buttons 24 includes a select key 26c for selecting an item or function designated by the cursor. The combination of the up and down cursor keys 26a and 26b and the select key 26c provide for inputting data, commands, etc. to the shelf tag 10. For example, the display 20 can show an alphanumeric table where a user can select alphanumeric characters via the up and down cursor keys 26a and 26b and the select key 26c in order to set the shelf tag 10 in a desired manner.

The shelf tag 10 in the preferred embodiment is preprogrammed with an access code which prevents unauthorized users from manipulating the shelf tag 10 in an undesired manner.

On the top of the housing 16, is a groove 30 for the placement of a card including written, typed, or graphical information such as for example advertisements for a grocery product. However, it will be appreciated that the display 20 could display graphical information as well. Thus, the shelf tag 10 may include a scrolling graphical advertisement for a product followed by or in conjunction with the price of the product, for example.

The shelf tag 10 is provided with an optical window 40 for receiving optical information (e.g., infrared signals) from another device. The shelf tag includes an optical device 42 (FIG. 2a) which includes an optical transmitter 50 (FIG. 2b) and an optical receiver 52 (FIG. 2b). In the preferred embodiment, the optical transmitter 50 includes an emitter diode and the optical receiver 52 includes a detector diode. The emitter diode is selected to match to detector diodes (not shown) in an optical transceiver in a ceiling unit 60 (FIG. 1b) and/or an optical transceiver in a mobile device 62 (FIG. 1b), so that it emits a maximum of infrared light at wavelengths at which the detector diodes of the ceiling device and/or the mobile device exhibit a maximum of sensitivity. The emitter diode may more specifically be of the same type as the emitter diodes of the ceiling unit 60 or the mobile device 62 (FIG. 2b).

Likewise, the detector diode is in a corresponding fashion selected to have maximum sensitivity to the optical transmissions emitted by the transmitters in the ceiling device 60 and/or the mobile device 62, and minimum sensitivity to any other kind of radiation. The detector diode may more specifically be of the same type as the detector diodes in the ceiling station.

The detector diode is preferably provided with a color filter adapted to suppress incident radiation at all other wavelengths than those selected for the transmission.

The optical device 42 is oriented so that its axes of reception and transmission are aligned (e.g., pointing upwardly at 20 degrees relative to a line perpendicular to the display 20) in order to optimize communications with the ceiling device 60.

Figure 1B:
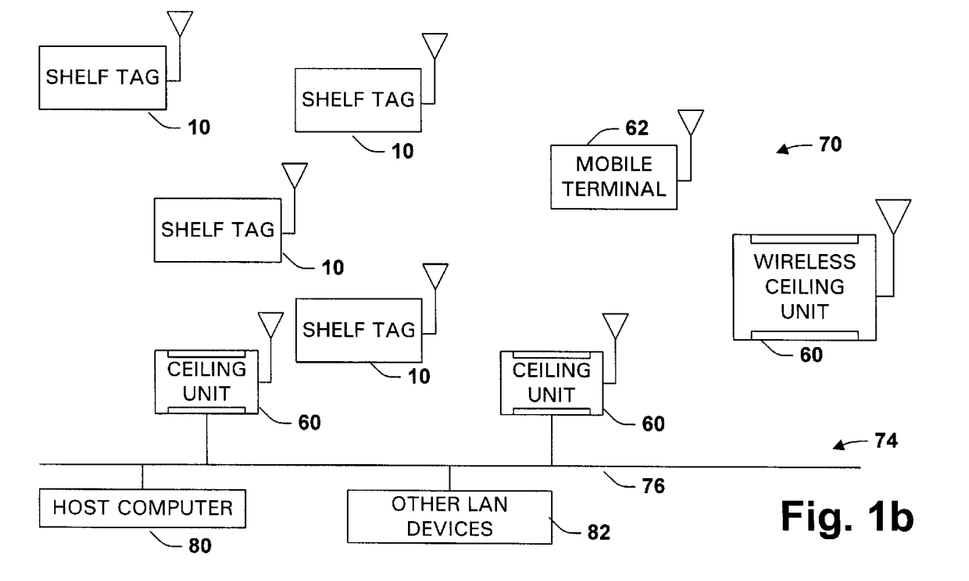
FIG. 1b is a block diagram of a communication system including a shelf tag in accordance with the present invention.

FIG. 1b is a block diagram of a communication system 70 including a plurality of the shelf tags 10 in accordance with the present invention. The communication system 70 is centered around a local area network (LAN) 74. The LAN 74 consists of in part one or more optical apparatuses such as for example ceiling units 60 connected together via a hardwired data communication path, commonly referred to as a system backbone 76. Of course, the ceiling units 60 do not necessarily have to be hardwired together—they could communicate via radio communications. The communication system 70 may be of the type utilized in retail stores or warehouses, for example. Such systems are useful for tracking inventory, replenishing stock, and changing pricing information or products. The information is transmitted to an end user via the shelf tags 10 which are typically located around respective products. Each shelf tag 10 may represent a particular product line and convey information such as price, inventory status etc. to a user. The ceiling units 60 are tied to a host computer 80 which serves as the controller of the communication system 70 as is conventional. In addition, the host computer 80 generally serves as a central storage medium for system data, etc. as is also conventional. The LAN 74 may include other devices (generally represented at 82) such as work terminals, cash registers, printers, facsimile devices, data storage facilities, etc. As will be appreciated, the electronic display device 10 of the present invention has utility with virtually any LAN and is not necessarily limited to the communication system 70 shown in FIG. 1b.

Users may enter inventory information using a hand held or portable mobile terminal 62 which can be carried throughout the store or warehouse. The information entered into the mobile terminals 62 can be optically transmitted to the shelf tags 10 and or the system back bone 76 by way of the ceiling units 60. In a retail facility, the communication system 70 can be useful for tracking products, maintaining inventory, updating prices, etc. Such a system 70 can efficiently update prices throughout the store almost immediately and have these prices reflected at a cash register for example. In this manner, substantial amounts of manpower is saved by avoiding the need to manually update prices at the product location as well as at the cash registers.

Figure 2A:
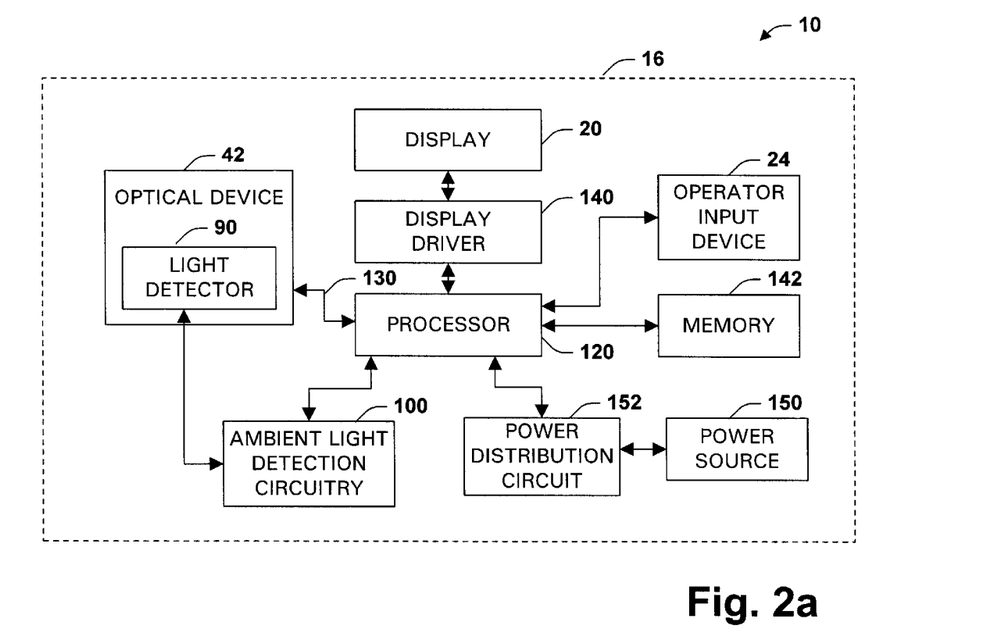
FIG. 2a is a block diagram of the shelf tag in accordance with the present invention.
Figure 2B:
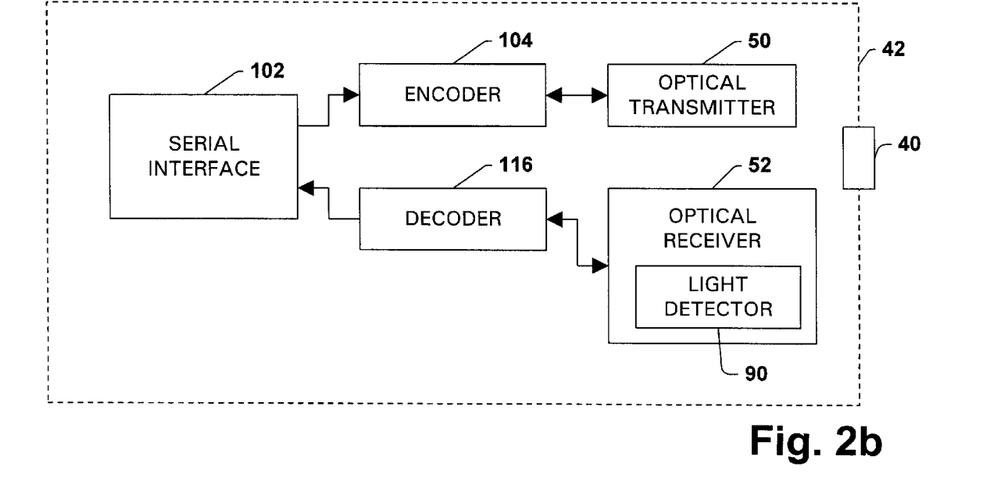
FIG. 2b is a block diagram of an optical device in accordance with the present invention.

Turning now to FIGS. 2a and 2b, a block diagram of the electronic circuitry associated with the shelf tag 10 is shown. As noted above, the shelf tag 10 includes an optical device 42 for receiving and transmitting optical signals. The optical device 42 also includes an ambient light detector 90. The ambient light detector 90 taps off the optical receiver 52 and supplies a signal representative of the ambient light to ambient light detection circuitry 100. The light carrying data is processed by the optical device 42 as is conventional. In the preferred embodiment, the optical device 42 includes a programmable serial interface device (SID) 102 such as a 16550 or 16450 UART (universal asynchronous receiver and transmitter) from National Semiconductor. Technically equivalent interface devices include but are not limited to universal synchronous and asynchronous receivers and transmitters (USARTs), asynchronous communications interface adapters (ACIAs), serial input/output (SIO) devices, data link controllers, multiple protocol communications controllers and serial communications controllers.

The serial interface device 102 receives data from a host device (typically in parallel format) through a serial output location and transmits an equivalent serial bit stream to an encoder 104. The encoder 104 transforms the bits into electrical pulses that occupy less than the full bit time and passes them to the optical transmitter 50 (e.g., infrared transmitter). The optical transmitter 50 transforms the electrical pulses into infrared light pulses for example and broadcasts the light pulses at a selected baud rate. The receiving side of the optical device 42 includes the optical receiver 52 (e.g., an IR receiver) that receives similar light pulses from a transmitter from an another device and transforms them into electrical pulses. The optical receiver 52 passes these electrical pulses to a decoder 116 for decoding the electrical pulses into a serial bit stream. The decoder 116 in turn routes the bit stream to a serial input location on the serial interface device 102 for communication to a processor 120. The optical device 42 preferably operates in half-duplex mode (i.e., with only the optical transmitter 50 or optical receiver 52 active at any given time) in order to prevent the optical device 42 from receiving the data it transmits. However, it will be appreciated that with additional shielding, the optical device 42 could be operated in full-duplex mode (i.e., both the optical transmitter 50 and the optical receiver 52 simultaneously active).

It will be appreciated that the serial interface 102 may include or be coupled to a programmable baud rate generator (not shown) for transmitting the serial bit stream at selectable baud rates. The serial interface 102 also may include an SID clock (not shown) that runs at a multiple of the baud rate so as to clock the encoder 104 and decoder 116. Accordingly, an operator of the host device could selectably control the optical transmission rate.

The optical device 42 is coupled via a control bus 130 to the processor 120 included in the shelf tag 10. The processor 120 is responsible for controlling the general operation of the shelf tag 10 with respect to processing and storing information received and transmitted by the optical device 42. The processor 120 is programmed to control and operate the various components within the shelf tag 10 in order to carry out the various functions described herein. The operator input device 24 is coupled to the processor 120 which allows an operator to input data to the shelf tag 10 which can be visually communicated via the shelf tag 10 to others and/or be communicated to the system backbone 76 or host computer 80. The information can be of the form of pricing information, advertisements, inventory or the like. The input device 24 can include such items as the aforementioned keypad, touch sensitive display, etc.

The display 20 is connected to and controlled by the processor 120 via a display driver circuit 140. A memory 142 tied to the processor 120 is also included in the shelf tag 10 for storing program code executed by the processor 120 for carrying out operating functions of the shelf tag 10 as described herein. The memory 142 also serves as a storage medium for temporarily storing information such as pricing information, advertisements, inventory or the like received from or intended to be transmitted to the ceiling unit 60 and/or mobile terminal 62. The memory 142 is adapted to store a complete set of the information to be displayed. According to a preferred embodiment, the memory 142 has sufficient capacity to store multiple sets of information, and the processor 120 could include a program for alternating or cycling between various sets of display information. This feature enables the display 20 to show rolling, scrolling or animation effects.

A power supply 150 is also included with the shelf tag 10 for providing power to the various components of the shelf tag 10 as is conventional. The power supply 150 may be in the form of a battery and/or connectable to an external power source such as a wall outlet. The power supply 150 provides power to the various components via a power distribution circuit 152 which is also tied to the processor 120. In the preferred embodiment, the power supply 150 is a battery. The use of a battery provides for a relatively autonomous shelf tag 10 which is easy to install and easy to relocate. Furthermore, the use of a battery eliminates the need for a cumbersome wiring network to connect the shelf tag 10 directly to a host computer.

The battery 150 may be of any suitable type such as a disposable alkaline battery or the like. The battery 150 may also be of the rechargeable type such as a Nickel Metal Hydride, Nickel Cadmium, Lithium Ion or the like. Additionally, the battery 150 may be of the type suitable for recharging via a solar cell. Any type of battery suitable for carrying on the present invention may be used and falls within the scope of the present invention.

As will be discussed in greater detail below, the processor 120 regulates the power distribution circuit 152 based on ambient light information provided by the ambient light detection circuitry 100. As a result, the processor 120 is able to place the shelf tag 10 in a low power state so that power may be conserved, thus extending battery life.

The processor 120 is also able to control the amount of power to specific components via the power distribution circuit 152. For example, the display device 20 for presenting information to a user could be of the liquid crystal type. However, a drawback with many liquid crystal displays is that they become difficult to read as ambient light decreases. Accordingly, the processor 120 upon sensing that the ambient light has fallen below a certain threshold could switch on a display light (not shown) that illuminates the LCD display in conditions of lower ambient light so that a user can more readily see the displayed information.

The aforementioned components of the shelf tag 10 are preferably housed in the less than palm sized housing 16 represented in phantom. This makes the shelf tag 10 highly portable, easy to relocate from one location to another, and easy to install.

Figure 3:
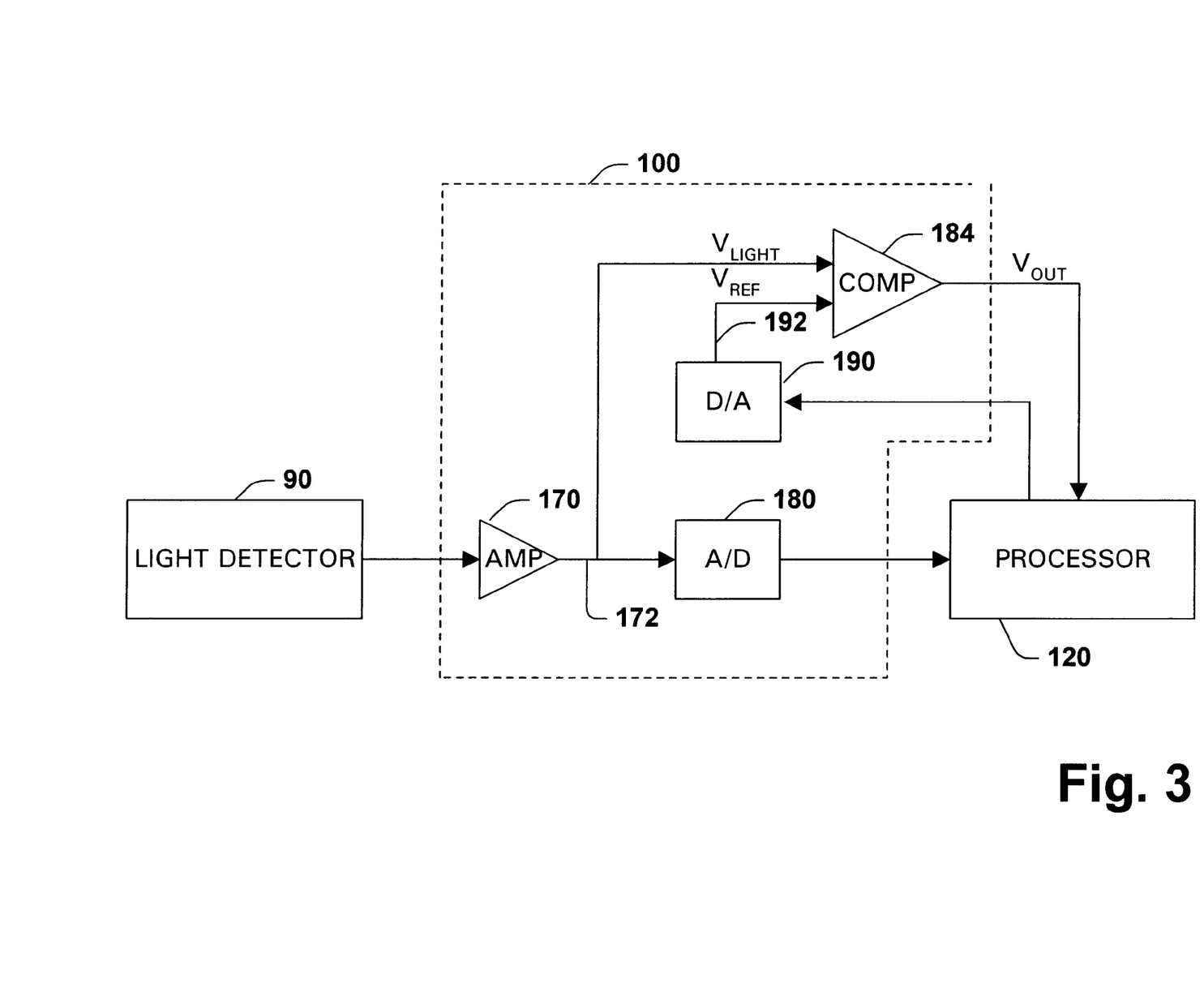
FIG. 3 is a block diagram of an ambient light detector, ambient light detecting circuitry and a processor in accordance with the present invention.

Turning now to FIG. 3, a block diagram representing the electrical components making up the ambient light detector 90, the ambient light detection circuit 100, and the processor 120 is shown. As was mentioned above, the ambient light detector 90 detects ambient light around the shelf tag 10. The ambient light detector 90 in the preferred embodiment taps off the optical receiver 52 to detect ambient light around the shelf tag 10, and convert it to an electric signal. However, it will be appreciated that other suitable devices may be used in connection with the ambient light detector 90 such as for example a photo diode or photo resistor which varies its output or resistance, respectively, according to ambient light levels.

The ambient light detector 90 provides the electrical signal corresponding to the ambient light to an amplifier 170. The amplifier 170 amplifies the electric signal output by the ambient light detector 90 and provides it via line 172 to an analog to digital (A/D) converter 180. The A/D converter 180 transforms the amplified analog electric signal to a digital signal that can be processed by the processor 120. The same analog electric signal output by the amplifier 170 is fed to a comparator 184. The digital signal of the A/D converter 180 which is applied to the processor 120 is used to calculate a reference voltage ($V_{REF}$). The reference voltage will be set to be approximately halfway between the voltage level obtained from the amplifier 170 when only fluorescent lighting is detected and the voltage level obtained when no light is detected. By comparing the current ambient lighting condition to $V_{REF}$ it can be determined which power state to place the shelf tag 10 in. Further detail as to the calculation of $V_{REF}$ is provided below with respect to the discussion of FIG. 5b.

Upon calculating $V_{REF}$, the processor 120 applies this signal to the comparator 184 via a digital to analog (D/A) converter 190. The D/A converter 190 transforms the digital signal of the processor 120 to analog form so that the comparator 184 can compare this signal with the analog signal output by the amplifier 170. The comparator 184 compares the voltage of the signal $V_{LIGHT}$ (indicative of the current ambient lighting condition) from line 172 and the voltage of $V_{REF}$ from line 192. The comparator 184 outputs a high signal when the $V_{LIGHT}$ is higher than $V_{REF}$. The comparator 184 outputs a low signal when $V_{LIGHT}$ equal to or lower than $V_{REF}$. The output of the comparator 184 is input to the processor 120. Thus, when the ambient lighting conditions are of a bright state (e.g., during daytime hours, or when the building lights are on) the comparator provides a high signal to the processor 120. When the ambient lighting conditions are of a dark state (e.g., at nighttime or when the building lights are off) the comparator 184 provides a low signal to the processor 120. As will be discussed in greater detail below, the processor 120 based on the ambient lighting conditions (i.e., output of the comparator 184) controls the power distribution circuit 152 in order to control the power supplied to the components of the shelf tag 10. In this manner, power can be conserved and thus battery life prolonged by placing the shelf tag 10 in a low power state when the shelf tag 10 will not be used such as for example at night. Additionally, the processor 120 can awaken or place the shelf tag 10 back into a normal power state when ambient lighting conditions become brighter thus indicating daylight or that the building lights are turned on or that a user is shining a light on the shelf tag 10.

Turning now to FIGS. 4a–5b, flowcharts are provided which represent the operation of the shelf tag 10 in accordance with the present invention. In overview, during daylight and/or business hours, the shelf tag 10 runs in a normal power state, that is its display 20 is operative as well as most of its other components. In the normal power state, power usage is significantly greater as compared to when the shelf tag 10 is in a low power state. The ambient light detector 90 and associated circuitry 100 dynamically monitors the ambient lighting conditions around the shelf tag 10. As was discussed above, the ambient light detector 90 provides a signal representative of the current ambient lighting conditions to the ambient light detection circuitry 100 and the processor 120. The current ambient lighting conditions are compared against $V_{REF}$ in the manner described herein. Based on the results of the comparison, the power state of the shelf tag 10 is controlled.

Figure 4A:
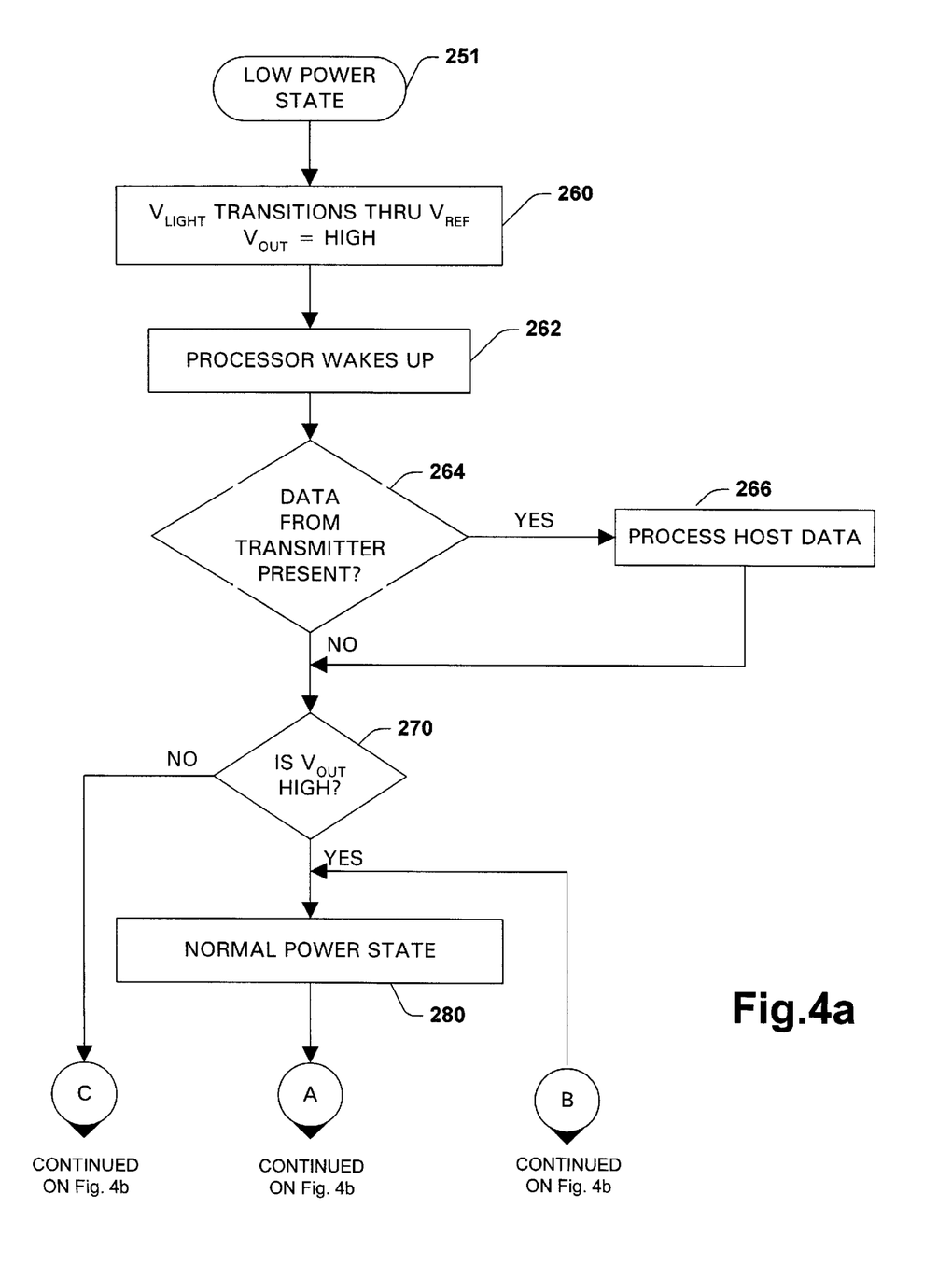
FIGS. 4a and 4b show a flow chart representing the operation of the shelf tag in accordance with the present invention.
Figure 4B:
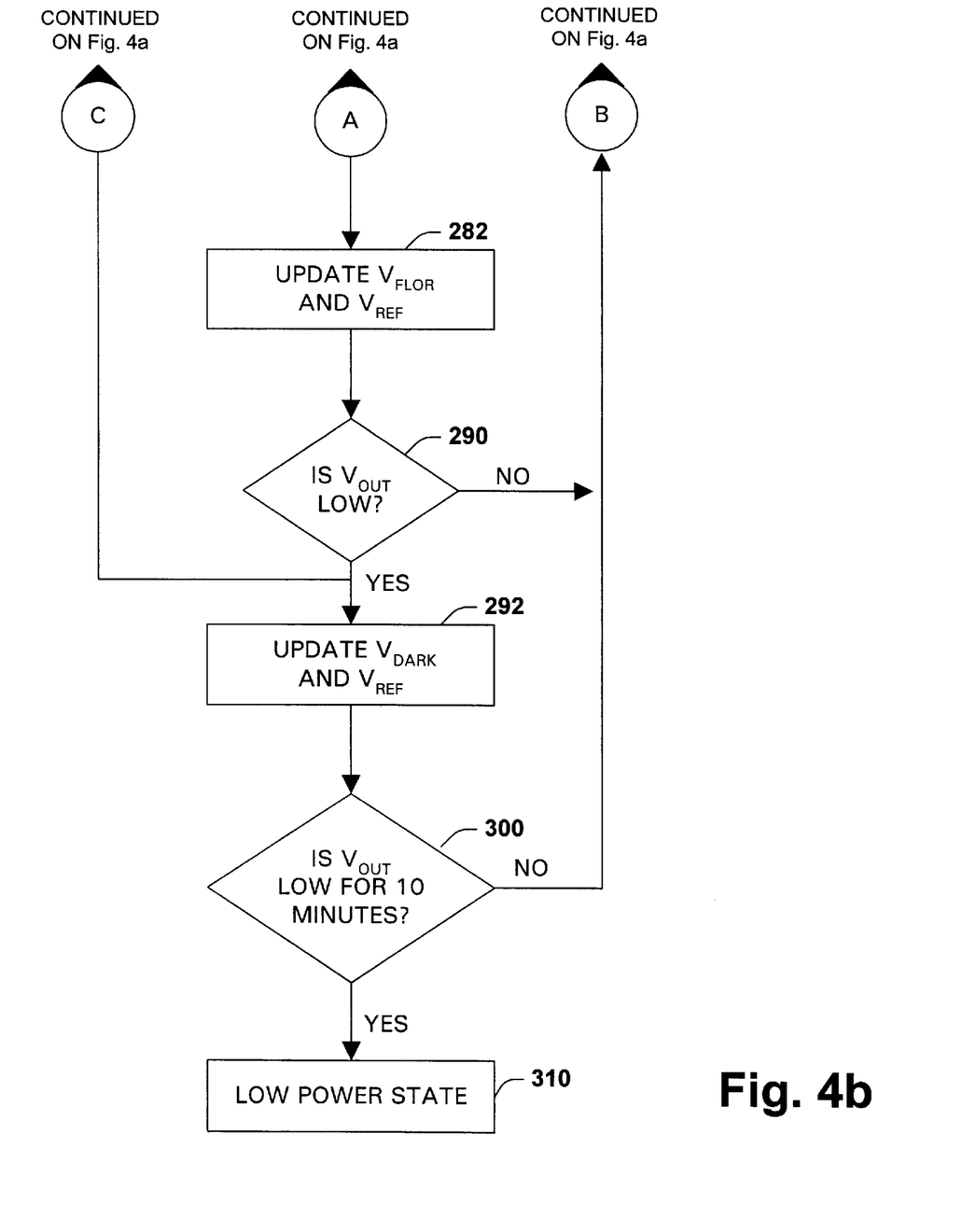

For example, if the current lighting conditions are greater than $V_{REF}$, this indicates that either it is daylight or the building lights are on. This is typically the period of time when a user would want to be able to use the shelf tag 10. Accordingly, in this ambient lighting condition, the shelf tag 10 is placed in a normal power state. If the current ambient lighting conditions are such that the representative signal is below $V_{REF}$, indicating a dark condition, the shelf tag 10 is placed in a low power state in order to conserve power.

Figure 5A:
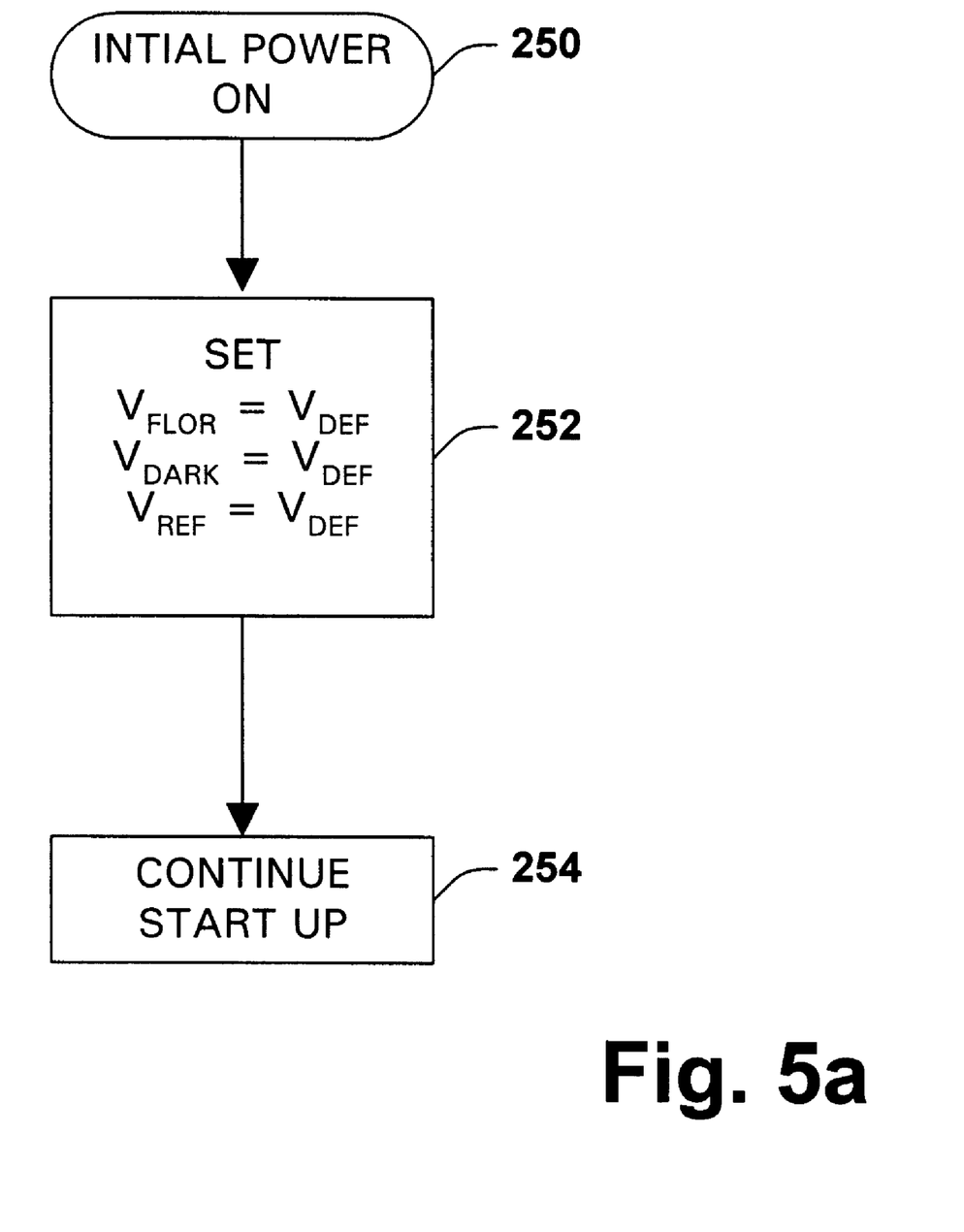
FIG. 5a is a flow chart representing the operation of setting default parameters in accordance with the present invention.

More specifically, referring to FIG. 5a, in step 250, the shelf tag 10 is placed in an active (i.e., on state). For sake of brevity, a discussion as to the powering up of the shelf tag 10 and performing general initializations is not discussed in great detail. When the shelf tag 10 is initially powered on, the processor 120 applies default values to the various lighting parameters used in the process described herein. Typically, the shelf tag 10 is preprogrammed during its manufacture with the default values. For instance, in step 252, the processor sets the various lighting parameters: $V_{FLOR}$ (fluorescent lighting condition, representative of ambient light due to building lights) equal to $V_{DEF}$ (default voltage); $V_{DARK}$ (dark lighting condition, representative of ambient lighting condition at night or a dark ambient lighting condition) also equals $V_{DEF}$; and $V_{REF}$ (reference voltage, representative of current lighting condition) equal to $V_{DEF}$.

$$V_{FLOR} = V_{DEF}$$

$$V_{DARK} = V_{DEF}$$

$$V_{REF} = V_{DEF}$$

The default voltage $V_{DEF}$ in the preferred embodiment is set to be within the zone of about halfway between the expected fluorescent and dark lighting conditions.

Now turning to FIG. 4a, in step 251, the shelf tag 10 is in a low power state by virtue of the shelf tag 10 initially powering on or having previously been placed into a low power state. Following step 251, the processor 120 continues to step 260 where the processor 120 calculates reference voltage $V_{REF}$ as determined by the process discussed in conjunction with FIG. 5b below. In step 260, the processor applies this $V_{REF}$ to the comparator 184, which compares $V_{REF}$ with the signal ($V_{LIGHT}$) from line 172 representative of the current ambient lighting conditions. Typically, the shelf tag 10 will only be turned on in a lighted condition and therefore $V_{LIGHT} > V_{REF}$. The comparator 184 outputs a high signal to the processor 120 if $V_{LIGHT} > V_{REF}$. If the processor 120 receives the high signal, then in step 262, the processor 120 wakes up from its low power state.

After this step, the processor advances to step 264 where it determines if data from the transmitter of the ceiling unit 60 is present. If yes, the processor 120 in step 266 processes this data (i.e., data from the host device) and then proceeds to step 270. If in step 264, the processor 120 determines that data from the transmitter of the ceiling unit 60 is not present, the processor 120 advances directly to step 270.

In step 270, the processor 120 determines from the comparator output signal ($V_{OUT}$) if $V_{LIGHT} > V_{REF}$ indicating a bright ambient lighting condition around the shelf tag 10. If a dark ambient lighting condition is determined (e.g., $V_{LIGHT} < V_{REF}$), the processor 120 advances to step 292. If a bright ambient lighting condition is determined, the processor 120 proceeds to step 280 where the shelf tag 10 is placed or maintained in a normal power state. In the normal power state, the display 20 is typically activated so that users can view information provided by the shelf tag 10. After step 280, the processor 120 in step 282 updates $v_{FLOR}$ and $V_{REF}$. As will be discussed in greater detail below with respect to the discussion of FIG. 5b, $V_{FLOR}$ and $V_{REF}$ are periodically updated in order for the shelf tag 10 to control its power level efficiently based on current lighting conditions.

In step 290, the processor 120 determines if $V_{LIGHT} < V_{REF}$, which is indicative of a dark ambient light state such as at nighttime or when the building lights are off. If $V_{LIGHT}$ is not below $V_{REF}$, the processor 120 returns to step 280 and the normal power state is maintained. If $V_{LIGHT} < V_{REF}$, then the processor 120 proceeds to step 292 where $V_{DARK}$ and $V_{REF}$ are updated in the manner discussed above with respect to updating $V_{FLOR}$ and $V_{REF}$. The updating of $V_{DARK}$ and $V_{REF}$ will be discussed in greater detail below with respect to the discussion of FIG. 5b. It will be appreciated that the updating of $V_{FLOR}$ I $V_{DARK}$ and $V_{REF}$ can be performed at various locations and any suitable point along the process.

Next, in step 300 the processor 120 determines if $V_{LIGHT} < V_{REF}$ for at least ten consecutive minutes. This step is performed so as to prevent the shelf tag 10 from inadvertently being placed in a low power state due to a temporary dark ambient lighting condition. Furthermore, since $V_{REF}$ is calculated over various iterations as will be described below, it takes several minutes for a steady state value to be obtained. For example, a user or other object may be situated around the shelf tag 10 such that light is blocked from reaching the shelf tag 10. In this situation, the processor 120 would perceive that a dark condition exists absent the precautionary step 300 and would power down the shelf tag 10. Thus, step 300 reduces the probability of powering down the shelf tag 10 due to a temporary dark ambient lighting condition. If $V_{LIGHT}$ is not less than $V_{REF}$ for at least 10 minutes, then the processor 120 returns to step 280 where a normal power state for the shelf tag 10 is maintained. Of course, any other suitable time other then 10 minutes could also be used.

If in step 300, $V_{LIGHT} < V_{REF}$ for at least ten consecutive minutes, the processor 120 proceeds to step 310 where it places the shelf tag 10 in a low power state in order to conserve power. The processor 120 accomplishes this powering down of the shelf tag 10 by controlling the power distribution circuit 152 so that less or no power is applied to various components of the shelf tag 10. More specifically, the powering down of the shelf tag 10 includes placing the processor 120 into a low power state. However, the ambient light detector 90 and associated circuitry 100 remains active so that the current ambient lighting conditions can be monitored. As the ambient light detector 90 and associated circuitry 100 draw very low power, there will not be a significant drain on the power source 150. In this manner, significantly less power is consumed by the shelf tag 10, thus prolonging the life of the battery 150 which is supplying power to the shelf tag 10.

Figure 5B:
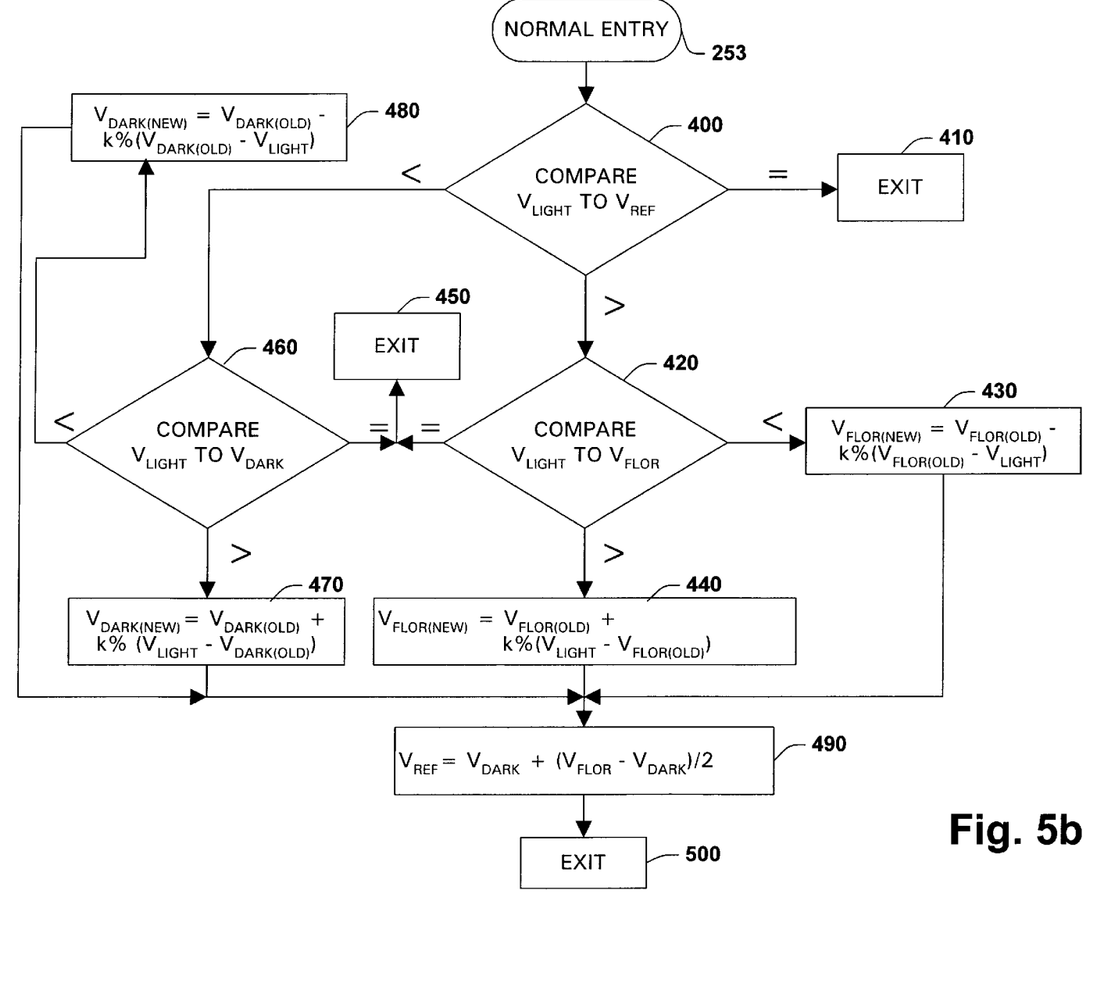
FIG. 5b shows a flow chart representing the operation of dynamically determining a reference voltage in accordance with the present invention.

Following step 310, the shelf tag 10 will wake up from its low power state when $V_{OUT}$ goes high again as indicated in step 260 of FIG. 4a. Turning now to FIG. 5b, a flowchart representing the dynamic determination of $V_{REF}$ in accordance with the present invention is shown. This process relates to the periodic updating of $V_{REF}$, $V_{FLOR}$ and $V_{DARK}$ mentioned above. In step 253, the process of updating $V_{REF}$ is initiated by the processor 120 as described with respect to steps 282 and 292 in FIG. 4b.

In step 400, the processor 120 compares $V_{LIGHT}$ to $V_{REF}$. If $V_{LIGHT}=V_{REF}$, the processor goes to step 410 where the process is returned to where it left off not updating either $V_{REF}$ and/or $V_{FLOR}$ and/or $V_{DARK}$. If in step 400, the processor 120 determines that $V_{LIGHT}>V_{REF}$, the processor 120 moves to step 420 where it compares $V_{LIGHT}$ to $V_{FLOR}$. As mentioned above, $V_{FLOR}$ corresponds to the fluorescent light condition (i.e., the ambient lighting condition around the shelf tag 10 when the building lights are on). If $V_{LIGHT}>V_{FLOR}$, this indicates that the ambient lighting condition around the shelf tag 10 is bright, that is brighter than when the ambient lighting condition is due to building lights only, or brighter than $V_{DEF}$. If this is the case ($V_{LIGHT}>V_{FLOR}$), the processor increases the value of $V_{FLOR}$ above that of $V_{DEF}$ as described in step 440 below. This step is performed to place $V_{FLOR}$ at its proper operating setting based on the ambient lighting condition for the particular shelf tag 10.

In step 440 the $V_{FLOR}$ is set to where it should be based on current ambient lighting conditions. This is accomplished by the processor 120 taking the initial value of $V_{FLOR}=V_{DEF}=V_{FLOR}$ (OLD) and increasing it according to the following equation to obtain $V_{FLOR(NEW)}$ (the proper value for $V_{FLOR}$ based on current ambient lighting conditions).

$$V_{FLOR(NEW)}=V_{FLOR(OLD)}+k\%(V_{LIGHT}-V_{FLOR(OLD)})$$

A constant k is used in order to gradually increase $V_{FLOR}$ (NEW) to what it should be. Otherwise, $V_{FLOR(NEW)}$ could change dramatically in situations where the building lights are fluttering, for example. Thus, to avoid this situation, $V_{FLOR(NEW)}$ is gradually ramped up to where it should be by performing several iterations of step 440. An iteration is performed each time the processor 120 loops through the aforementioned process. In the preferred embodiment, k is set to about "10". However, it will be appreciated that any value for k may be chosen depending on how fast it is desired to set $V_{FLOR\ (NEW)}$. By setting k=10, approximately 10 iterations of step 430 are performed before $V_{FLOR(NEW)}$ reaches a steady state value.

If in step 420, the processor 120 determines that $V_{LIGHT}<V_{FLOR(OLD)}$, the processor 120 proceeds to step 430 where it calculates $V_{FLOR(NEW)}$ based on the following equation:

$$V_{FLOR(NEW)}=V_{FLOR(OLD)}-k\%(V_{FLOR(OLD)}-V_{LIGHT})$$

If in step 420, the processor 120 determines that $V_{LIGHT}=V_{FLOR(OLD)}$, the processor 120 goes to step 450 where the process is returned to where it left off not updating either $V_{REF}$ and/or $V_{FLOR}$ and/or $V_{DARK}$. Returning back to step 400, if the processor 120 determines that $V_{LIGHT}<V_{REF}$, the processor 120 advances to step 460 where it compares $V_{LIGHT}$ to $V_{DARK}$. If in step 460, $V_{LIGHT}=V_{DARK}$, the processor 120 moves to step 450 where the process is returned to where it left off not updating either $V_{REF}$ and/or $V_{FLOR}$ and/or $V_{DARK}$. If in step 460, the processor determines that $V_{LIGHT}>V_{DARK}$, the processor proceeds to step 470 where it calculates a new value for $V_{DARK}$ (i.e., $V_{DARK}$ (NEW)). As was mentioned above, the initial value used for $V_{DARK}$ is set equal to $V_{DEF}$. $V_{DARK(NEW)}$ is calculated in a manner similar to how $V_{FLOR(NEW)}$ was calculated in step 440. In calculating $V_{DARK(NEW)}$, the processor 120 employs the following equation.

$$V_{DARK(NEW)}=V_{DARK(OLD)}+k\%(V_{LIGHT}-V_{DARK(OLD)})$$

If in step 460, the processor 120 determines that $V_{LIGHT}<V_{DARK}$, the processor 120 advances to step 480. In step 480, the processor 120 calculates $V_{DARK(NEW)}$ based on the following equation:

$$V_{DARK(NEW)}=V_{DARK(OLD)}-k\%(V_{DARK(OLD)}-V_{LIGHT})$$

After the processor 120 completes any of steps 430, 440, 470 or 480, it proceeds to step 490 where it calculates $V_{REF}$ according to the following equation.

$$V_{REF} = V_{DARK} + \frac{(V_{FLOR} - V_{DARK})}{2}$$

The values that are used for $V_{DARK}$ and $V_{FLOR}$ are the latest values available (e.g., $V_{DARK(NEW)}$, $V_{FLOR(NEW)}$). In this manner $V_{REF}$ is dynamically calculated. An advantage of dynamically calculating $V_{REF}$ as opposed to simply applying a default value is that in conditions where the bright light conditions substantially vary, a default $V_{REF}$ could result in powering down the shelf tag 10 when such powering down is not desired. For instance, if the shelf tag 10 is located near a store window, and the default value for $V_{REF}$ is fairly high, the $V_{LIGHT}$ could possibly fall below $V_{REF}$ when it is nighttime but the building lights are on. Because daylight ambient light is typically significantly brighter than fluorescent ambient light, $V_{LIGHT}$ obtained when there is only building light available could be perceived by the processor 120 as being a dark ambient lighting condition. Thus, by employing a dynamic $V_{REF}$, errors in regulating the shelf tag can be reduced.

After $V_{REF}$ is calculated in step 490, it is applied by the processor 120 in the manner described above. After step 490, the processor 120 moves to step 500 where it returns to the process it was performing prior to the update request.

Thus, the present invention affords for an electronic shelf tag 10 which can vary its power state in accordance with surrounding ambient light in order to conserve power. Furthermore, the present invention provides for an electronic shelf tag 10 which can vary its display characteristics according to ambient lighting conditions so as to optimize viewability of its display. Unlike many conventional shelf tags, the shelf tags 10 of the present invention can be awakened by shinning a light on it so as to place it in a normal power mode.

In terms of an illustrative example, a user can employ the shelf tag 10 in a retail store for example. The shelf tag 10 can be used to provide information via its display 20 to a user (e.g., a customer). The shelf tag 10 can be updated by either of the ceiling unit 60 or the mobile terminal 62. The ceiling units 60 can be used to update a plurality of shelf tags 10, while the mobile terminals 62 typically update one shelf tag 10 at a time. One advantage of using a mobile terminal 62 is that its optical signal is focused and thus eliminates the possibility of an unintended shelf tag 10 from receiving the transmitted data.

Figure 6:
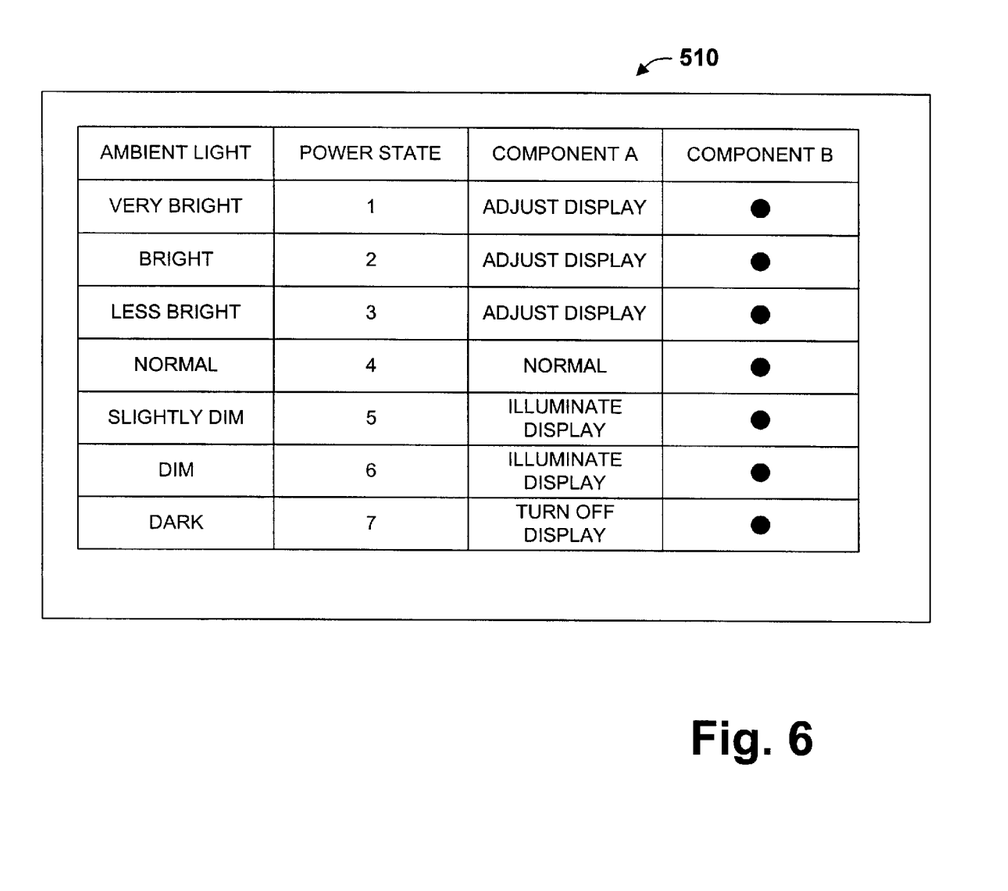
FIG. 6 is a look up table which can be used for determining ambient lighting conditions in accordance with the present invention.

Although the invention has been shown and described with respect to certain preferred embodiments, it is obvious that equivalents and modifications will occur to others skilled in the art upon the reading and understanding of the specification. For example, the invention has been described above primarily in the context of calculating $V_{REF}$ dynamically. However, it will be appreciated that the present invention can be used in conjunction with a lookup table 510 as shown in FIG. 6. The processor 120 could simply compare the $V_{LIGHT}$ provided thereto from the A/D converter 180 to the lookup table 510. The processor 120 could control the power distribution circuit 152 in accordance with where $V_{LIGHT}$ falls within the lookup table 510. For example, if $V_{LIGHT}$ falls within the very bright ambient lighting range, the processor could instruct the power distribution circuit 152 to activate the display 20 for viewing by the user. Moreover, the processor 120 could control the display 20 so that it is most easy to view taking into account the current bright ambient lighting conditions. For example, the contrast, intensity, brightness, etc. of the display 20 could be varied in accordance with the lighting conditions to optimize viewability.

Likewise, if the ambient lighting conditions are in a dim state, the processor 120 could control the power distribution circuit 152 so that power is applied to a light of the display 20 so that the display 20 is illuminated for better viewing. It should be appreciated that there are multitudes of variations of powering up and powering down of the various components of the shelf tag 10 with respect to the current ambient lighting conditions, all of which fall within the scope of the present invention.

The present invention can also include other features such as a solar cell (not shown) coupled to the shelf tag 10 for supplying power to the shelf tag 10 during bright ambient lighting conditions. The solar cell could collect energy from irradiated light of other electromagnetic waves and convert the received energy into electric power, which could be used to charge the power supply 150 of the shelf tag 10.

Furthermore, the present invention could also include a proximity switch (not shown) and sensor (not shown) to detect the presence of a potential user within the vicinity of the shelf tag 10. If the sensor detects a person nearby, the processor 120 could place the shelf tag 10 in a normal power mode (e.g., activate the display). When the sensor determines that no person is nearby the shelf tag 10, the processor 120 could power down the shelf tag 10 in order to conserve power.

Moreover, it will be appreciated that the shelf tags 10 can include timers in order to be awakened at a particular time from a sleep mode. Nevertheless, the advantageous ambient light detection aspect of the present invention provides for the shelf tags 10 to be awakened without a timer simply by being exposed to bright ambient light conditions.

The present invention includes all such equivalents and modifications, and is limited only by the scope of the following claims.

What is claimed is:

1. An electronic shelf display device including an independent power source, the electronic shelf display comprising:
    a housing;
    a processor disposed in the housing;
    a display device supported by the housing and coupled to the processor, the display device being capable of displaying information;
    an optical device coupled to the processor for at least receiving optical communications; and
    ambient light detector circuitry coupled to the processor, the ambient light detector circuitry being operative for regulating the power state of the electronic shelf display device based on ambient lighting conditions determined by the ambient light detector circuitry.

2. The electronic shelf display device of claim 1, wherein the ambient light detector circuitry is further operative to place the electronic shelf display device in a low power state upon determining a dark ambient lighting condition has occurred in order to conserve power provided by the independent power source.

3. The electronic shelf display device of claim 1, wherein the ambient light detector circuitry is further operative to place the electronic shelf display device in a normal power state upon determining a light condition has occurred in order to allow for normal operating conditions of the electronic shelf display device.

4. The electronic shelf display device of claim 1, wherein the optical communications are infrared communications.

5. The electronic shelf display device of claim 1, wherein the independent power source is at least one battery.

6. The electronic shelf display device of claim 5, wherein the processor places the electronic display device in a sleep mode based on ambient lighting conditions.

7. The electronic shelf display device of claim 5, wherein the processor takes the electronic display device out of a sleep mode based on ambient lighting conditions.

8. The electronic shelf display device of claim 5, wherein the processor periodically polls the ambient light detector circuitry to determine ambient lighting conditions.

9. The electronic shelf display device of claim 1, wherein the display further displays graphical information.

10. The electronic shelf display device of claim 1, wherein the display further displays alphanumeric information.

11. The electronic shelf display device of claim 1 further including a radio device.

12. The electronic shelf display device of claim 11, wherein the radio device includes a radio receiver.

13. The electronic shelf display device of claim 11, wherein the radio device includes a radio transmitter.

14. The electronic shelf display device of claim 1, wherein the optical device includes an optical receiver.

15. The electronic shelf display device of claim 1, wherein the optical device includes an optical transmitter.

16. The electronic shelf display device of claim 1 further including a memory device.

17. A system for displaying information, the system comprising:
    a host computer, the host computer including:
        a processor for controlling the host computer; and;
        a memory device coupled to the processor for storing data;
    an optical apparatus coupled to the host computer wherein the host computer communicates with the electronic shelf display device;
    a plurality of electronic display devices, the electronic display devices including:
        an electronic shelf display device each including an independent power source including an independent power source, the electronic shelf display comprising:
            a housing;
            a processor disposed in the housing;
            a display device supported by the housing and coupled to the processor, the display device being capable of displaying information;
            an optical device coupled to the processor for at least receiving optical communications; and
            ambient light detector circuitry coupled to the processor, the ambient light detector circuitry being operative for regulating the power state of the electronic shelf display device based on ambient lighting conditions.

18. The system of claim 17, further including a mobile terminal for optically communicating with at least one of the plurality of electronic display devices.

19. The system of claim 17, wherein the host computer further includes a radio device for radio communications with a radio device of at least one of the plurality of electronic display devices.

20. The system of claim 17, wherein the optical communications are infrared communications.

21. The system of claim 17, wherein the isolated power source is at least one battery.

22. The system of claim 17, wherein the processor of the electronic display device regulates the power state of the electronic display device based on ambient lighting conditions determined by the ambient light detector circuitry.

23. The system of claim 22, wherein the processor of the electronic display device places the electronic display device in a sleep mode based on ambient lighting conditions.

24. The system of claim 22, wherein the processor of the electronic display device takes the electronic display device out of a sleep mode based on ambient lighting conditions.

25. The system of claim 22, wherein the processor of the electronic display device periodically polls the ambient light detector to determine ambient lighting conditions.

26. A method for controlling the power state of an electronic display device, comprising the steps of:

using an ambient light detector to determine ambient lighting conditions; and using a processor to regulate the power state of the electronic display device based upon the ambient lighting conditions determined by the ambient light detector.

27. The method of claim 26, wherein the processor places the electronic display device in a sleep mode based on ambient lighting conditions.

28. The method of claim 26, wherein the processor takes the electronic display device out of a sleep mode based on ambient lighting conditions.

29. The method of claim 26, wherein the processor periodically polls the ambient light detector to determine ambient lighting conditions.

* * * * *